Figure 1:
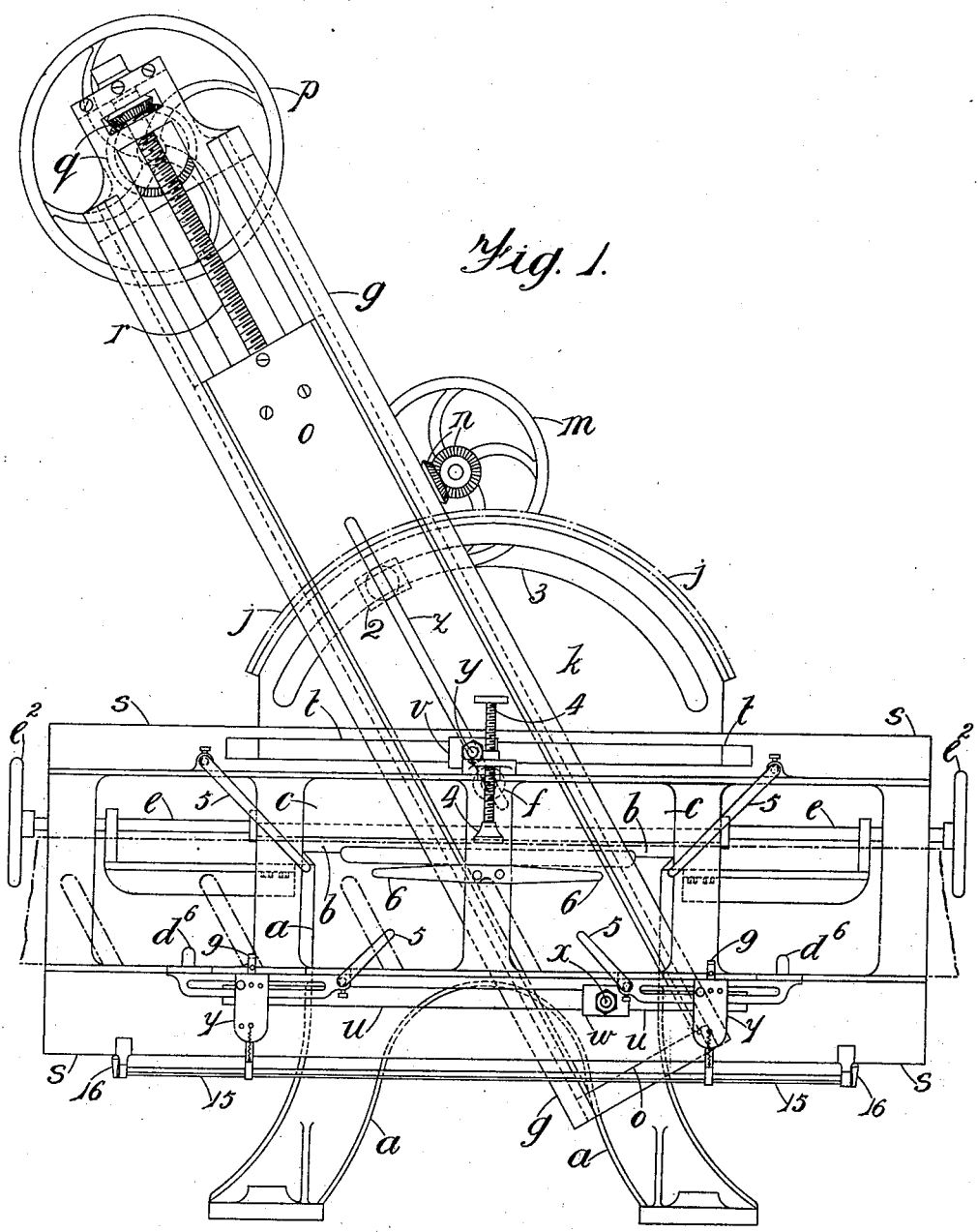

No. 887,746. PATENTED MAY 19, 1908.
R. S. ALLAN.
WOODWORKING MACHINE.
APPLICATION FILED FEB. 3, 1908.

5 SHEETS—SHEET 1.

WITNESSES:
Fred White
René Bruine

INVENTOR:
Robert Stamp Allan,
By Attorneys,

No. 887,746. PATENTED MAY 19, 1908.
R. S. ALLAN.
WOODWORKING MACHINE.
APPLICATION FILED FEB. 3, 1908.
5 SHEETS—SHEET 2.
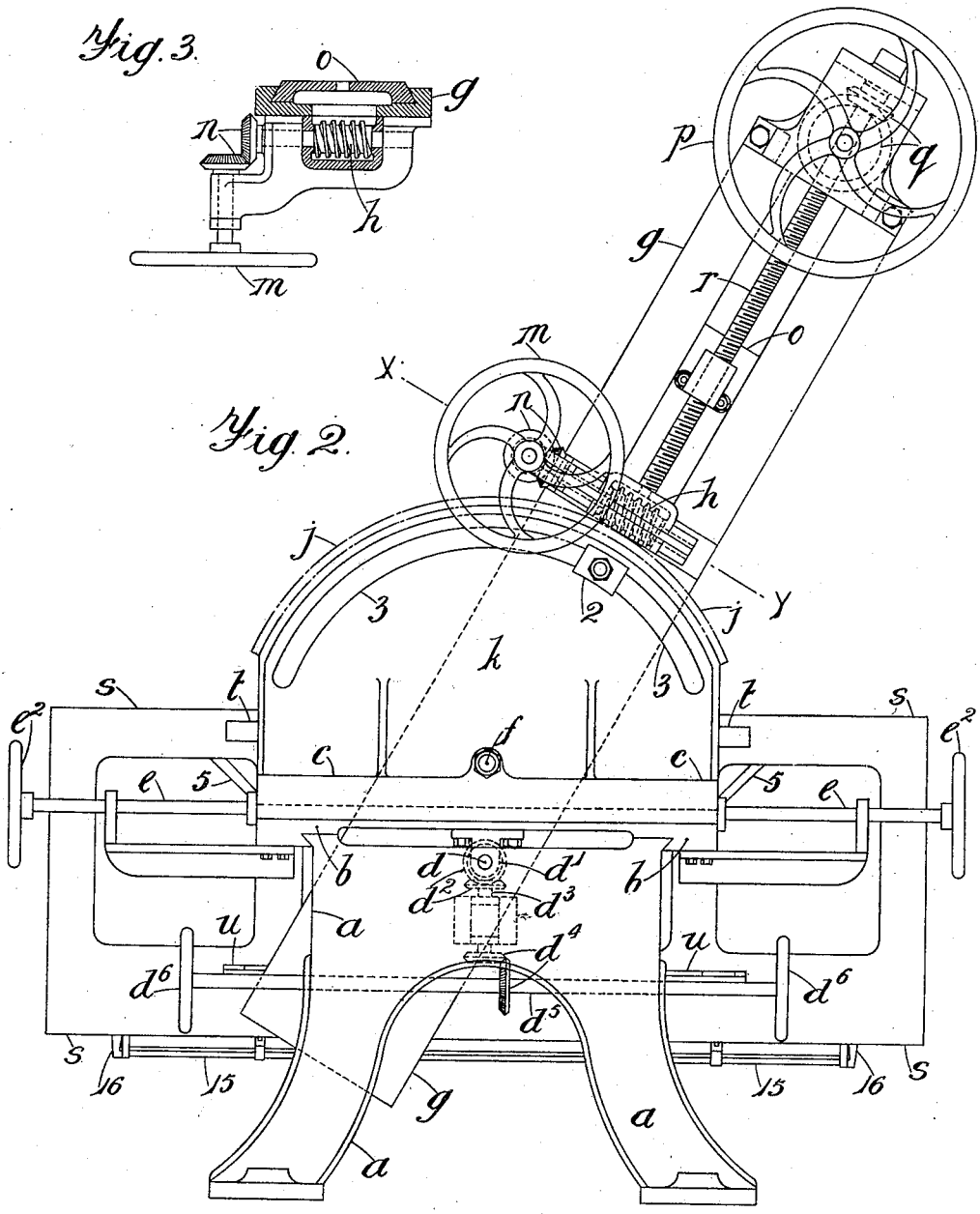
WITNESSES:
Fred White
René Muine
INVENTOR:
Robert Stamp Allan,
By Attorneys,
Arthur E. Fraser Uma

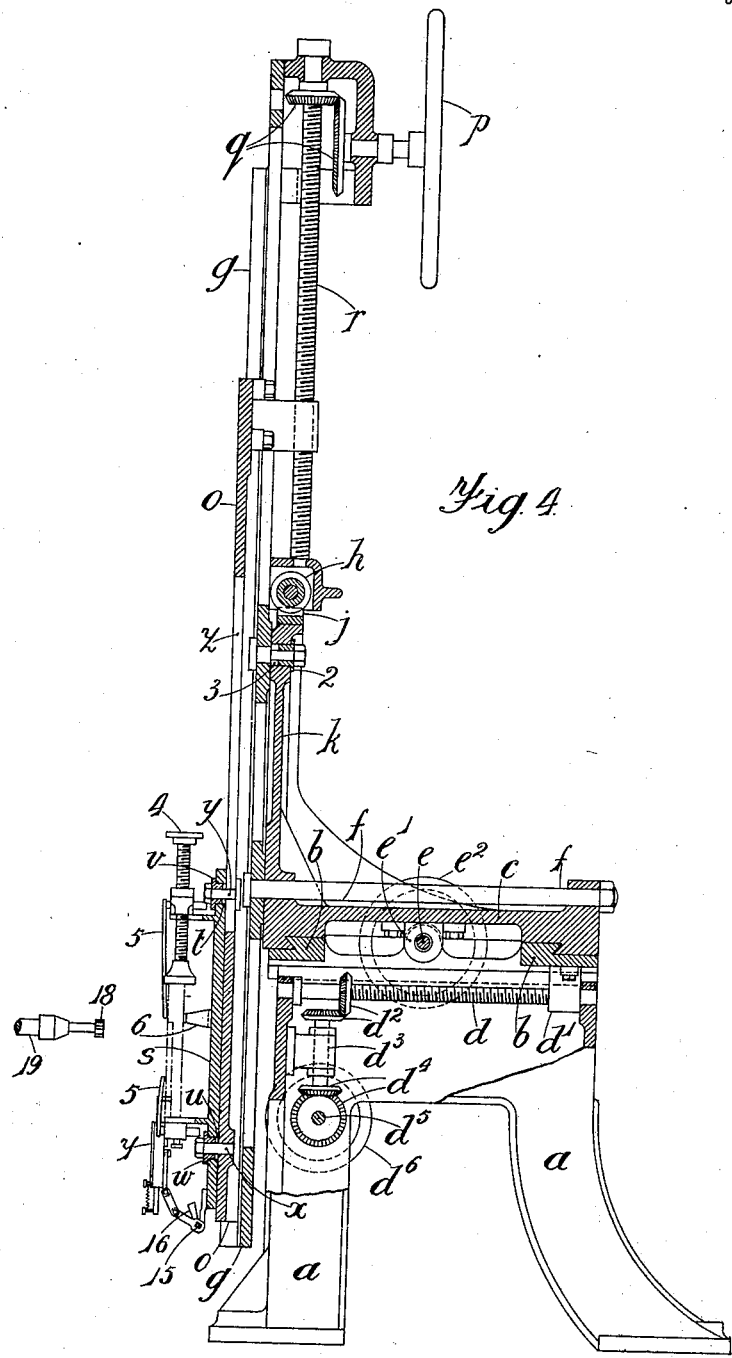

No. 887,746. PATENTED MAY 19, 1908.
R. S. ALLAN.
WOODWORKING MACHINE.
APPLICATION FILED FEB. 3, 1908.
5 SHEETS—SHEET 4.
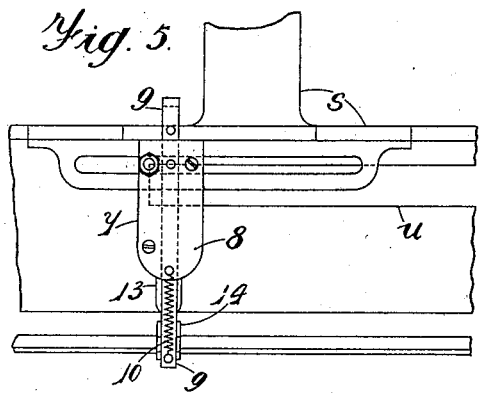
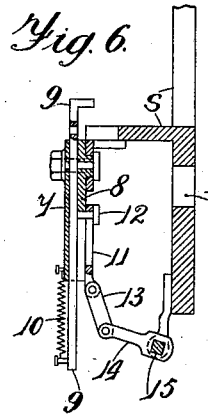
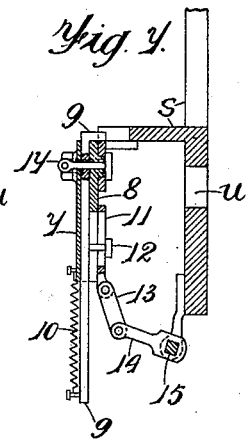
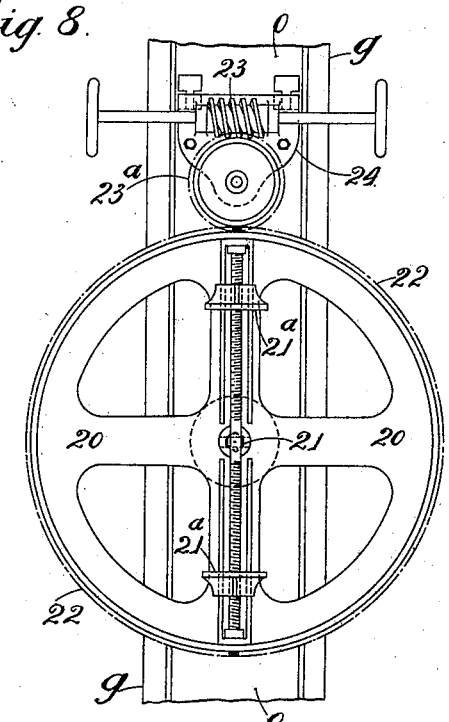
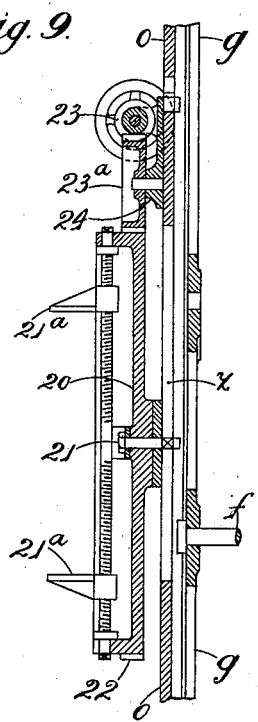
WITNESSES:
Fred White
René Muine
INVENTOR:
Robert Stamp Allan,
By Attorneys, No. 887,746. PATENTED MAY 19, 1908.
R. S. ALLAN.
WOODWORKING MACHINE.
APPLICATION FILED FEB. 3, 1908.
5 SHEETS—SHEET 5.
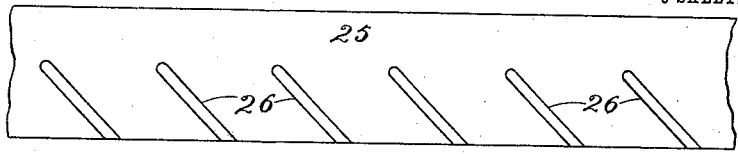
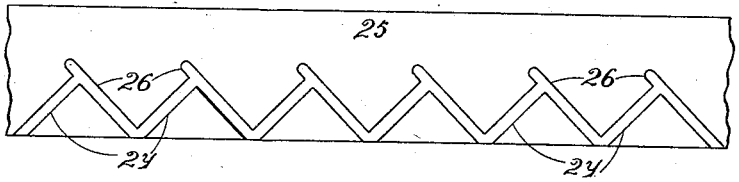
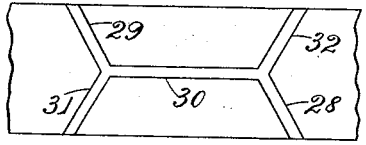 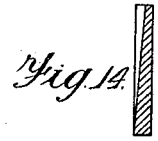
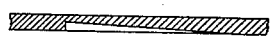 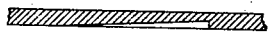
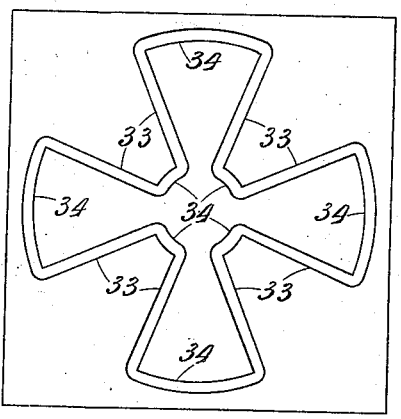
WITNESSES:
Fred White
René Bruine
INVENTOR:
Robert Stamp Allan
By Attorneys,

UNITED STATES PATENT OFFICE.

ROBERT STAMP ALLAN, OF GATESHEAD, ENGLAND.

WOODWORKING-MACHINE.

No. 887,746.　　　Specification of Letters Patent.　　　Patented May 19, 1908.

Application filed February 3, 1908. Serial No. 414,057.

*To all whom it may concern:*

Be it known that I, ROBERT STAMP ALLAN, a subject of the King of Great Britain and Ireland, and a resident of Gateshead, in the county of Durham, England, have invented certain new and useful Improvements in Woodworking-Machines, of which the following is a specification.

This invention relates to wood-working machines, and has special reference to machines of the kind having a reciprocating work-carrying frame or table guided in its travel by guides that are adapted to be adjusted to cause the frame to travel in any direction (within limits) in the plane in which it is mounted without altering the angle at which it or the work lies such as described in the specification of my previous patent No. 848,797 dated 2nd. April, 1907, and the object of the invention is to improve the construction or arrangement of such machines so as to render same capable of more extended use.

I will fully describe the invention with reference to the accompanying drawings wherein Figure 1 is a front view of a wood-working machine embodying one form of my improvements; Fig. 2 is a rear view of Fig. 1; Fig. 3 is a part sectional plan on the line X—Y in Fig. 2; and Fig. 4 is a sectional end view of Fig. 1. Fig. 5 is a part enlarged front view showing a detail hereinafter more particularly referred to; and Figs. 6 and 7 are sectional end views of same. Fig. 8 is a part front view of a modification; and Fig. 9 is a central vertical section of Fig. 8. Figs. 10, 11, 12, 13, 14, 15, 16 and 17 are views showing various kinds of work that can be performed by the machine shown in the previous figures.

Referring to Figs. 1 to 7 of the drawings, in a machine made in accordance with this form of my invention I employ a frame or bed-plate $a$ on which is arranged a compound slide comprising a plate or member $b$, adapted to be adjusted or traveled transversely on the frame or bed-plate, and a table $c$, adapted to be adjusted or traveled longitudinally on the plate or member $b$, the table $c$ being thus capable of both transverse and longitudinal adjustment on the frame or bed-plate $a$. The plate or member $b$ is adjusted or traveled transversely on the frame or bed-plate $a$ by a screwed rod $d$ co-acting with a nut $d^1$ (Figs. 2 and 4) on the plate or member $b$ and operated by bevel gearing $d^2$, a vertical shaft $d^3$, bevel gearing $d^4$, a horizontal shaft $d^5$, and handwheels $d^6$; and the table $c$ is adjusted or traveled longitudinally on the plate or member $b$ by a screwed shaft $e$ co-acting with a nut $e^1$ (Fig. 4) on the table $c$ and provided with operating handwheels $e^2$. Scales and adjustable stops may be provided for indicating and limiting the transverse and longitudinal adjustments or travels of the table $c$. On or to the front of the table $c$ I mount on a suitable pivot $f$ a guide member $g$ adapted to be adjusted to various angles by a worm $h$ co-acting with a semi-circular or curved rack $j$ on a vertical flange or quadrant $k$ on the table $c$, said worm $h$ being adapted to be operated by a handwheel $m$ and bevel gearing $n$ or otherwise suitably. A scale may be provided for showing the inclination or adjustment of the guide member $g$. The guide member $g$ is provided with a reciprocating slide $o$ sliding in or on said member and adapted to be reciprocated or operated therein or thereon by a handwheel $p$, bevel gearing $q$ and a screwed rod $r$ or otherwise suitably.

The work to be operated on is carried by a work-carrying frame $s$ adjustably connected to the reciprocating slide $o$. The work frame $s$ comprises suitably connected upper and lower bars or members having longitudinal slots $t$, $u$ respectively within which blocks $v$, $w$ are disposed. The lower block $w$ is connected to the reciprocating slide $o$ by a fixed bolt, stud or the like $x$, and the upper block $v$ is connected to the reciprocating slide $o$ by a bolt or the like $y$ passing through or arranged within a slot $z$ therein. The guide member $g$ and slide $o$ may be thus adjusted to any angle within the limits allowed by the length of the slots $t$, $u$ and $z$ without altering the angle at which the work frame $s$ and the work lie. To alter the angle or inclination of the guide member $g$ and slide $o$, the blocks $v$, $w$ clamping the work frame $s$ to the latter are loosened, and the guide member $g$ is then adjusted to the required angle by operating the worm $h$ co-acting with the rack $j$. After adjustment the guide member $g$ may be clamped by tightening a block 2 sliding in a slot 3 in the flange or quadrant $k$, and the work frame $s$ is clamped to the reciprocating slide $o$ by tightening the blocks $v$, $w$ aforesaid. The work frame $s$ and work can then be reciprocated or traveled in a path corresponding to the inclination or po sition of the guide member *g* by operating the reciprocating slide *o* by the handwheel *p*, bevel gear *q* and screwed rod *r* as above described.

The machine may be provided with sliding rods or other suitable supports adapted to be slid or otherwise moved into position to support the work frame *s* while the guide member *g* is being adjusted, and to be moved clear of the work frame when the guide member has been adjusted as required and the frame clamped to the reciprocating slide *o*.

The work frame *s* is provided with a clamp 4 for securing the work therein, and it is also provided with pivoted adjustable clips or the like 5—5 for further retaining the work in position, and the frame may be provided with a spring 6 for pressing the work against said clips or the like 5—5.

The lower bar or member of the work frame *s* is provided at each end with a gage 7 for use when grooving staircase stringer boards, supports for shelving and the like. Each gage comprises, as shown best in Figs. 5, 6 and 7, a bracket 8 adjustably mounted on the lower bar or member of the work frame and carrying a sliding stop 9 normally held raised by a spring or the like 10 and adapted to be depressed against said spring by a slotted link 11 engaging a pin 12 on the sliding stop 9 and connected by a link 13 to an arm 14 on a rocking shaft 15 mounted on or carried by the lower bar or member. The sliding stops 9, 9 when raised engage the work and are depressed to disengage same by operating the rocking shaft by handles 16, 16.

Either of the sliding stops 9, 9 may be held in the depressed or inoperative position by a pin 17 (Fig. 7) without affecting the operation of the other by the rocking shaft 15. In use, when grooving stringer boards or supports for shelving and the like, one of the stops 9 is locked in its depressed position while the other is adjusted so that it engages a previously cut groove in the work, which is indicated in dot-and-dash lines in Figs. 1 and 4, and, after a groove is cut, the work is moved or adjusted in the work frame *s* until the stop engages the next groove when the work is in position for another groove to be cut. The arms 14, 14 for operating the sliding stops 9 are adapted to slide on the rocking shaft 15 to allow of the adjustment of the gages 7, 7.

For performing the cutting operation I employ a revolving cutter 18 (Fig. 4) attached to a horizontal spindle 19 suitably driven and preferably mounted in or on a separate and fixed frame or bracket. The bed-plate or frame *a* of the machine may be mounted on rails or rollers so that the machine may be moved bodily towards and away from the cutter 18, or the machine may be adapted to pivot on a carriage mounted on rails or rollers.

For cutting circular or curved grooves we provide the machine with a special work frame 20 (Figs. 8 and 9) adapted to be substituted for the work frame *s* above described and to be revolubly connected to the reciprocating slide *o* above described by a bolt 21 passing through the slot *z* in the slide *o*. This work frame is provided with self-centering or other clamps 21ª, 21ª for securing the work and with a circular rack 22, and is revolved by a worm 23 and intermediate gear wheel 23ª coöperating with the rack 22, said worm 23 and gear wheel 23ª being mounted in a bracket 24 detachably connected to the reciprocating slide *o*.

Various examples of work that can be performed by the machine above described are illustrated in Figs. 10 to 17.

When grooving staircase stringer boards, the work 25 (Fig. 10) is arranged within the work frame *s* which is raised by the reciprocating slide *o* until the lower edge of the work is above the cutter 18 (Fig. 4) and the guide member *g* is set to the angle of the tread grooves 26 (Fig. 10). The table is then traveled transversely towards the cutter by operating the screwed rod *d* as above described until the work overhangs the cutter 18 to the required depth of the groove, and a tread groove 26 is then cut by traveling the work downwards across the cutter by operating the reciprocating slide *o* by the handwheel *p*, bevel gearing *q* and screwed rod *r*. When the groove is of the required length the work is raised clear of the cutter by the reciprocating slide *o*, and it is adjusted in the work frame *s* for the next groove to be cut. When all the tread grooves are cut, the guide member *g* is set to the angle of the riser grooves 27 (Fig. 11) and the riser grooves are cut.

To perform the work shown in Fig. 12, the guide member *g* is set to the angle of the grooves 28 and 29, and the groove 28 is cut by traveling the work across the cutter by operating the reciprocating slide *o*. The horizontal groove 30 is then cut by traveling the work longitudinally across the cutter by operating the table *c* by the screwed shaft *e*. The groove 29 is then cut by again traveling the work by operating the reciprocating slide *o*, and finally the guide member *g* is set to the angle of the grooves 31 and 32 and these grooves are cut. In short, vertical grooves at any angle to the horizontal, within the capacity of the machine, may be cut by setting the guide member *g* to the particular angle required and traveling the work frame *s* and the work at that angle across the cutter by operating the reciprocating slide *o*, the work frame and work always remaining horizontal. Horizontal grooves may be cut by traveling the work longitudinally across the cutter by operating the table c by the screwed shaft e. The work is advanced towards and retracted from the cutter and the depth of the cut is regulated by traveling the table c transversely by the screwed rod d, and the depth of either vertical or horizontal grooves may be tapered or gradually reduced or enlarged, as shown in Figs. 13, 14, 15 and 16, by simultaneously transversely adjusting the table c by the rod d when the groove is being cut.

Work such as shown in Fig. 17 may be performed by the employment of the revoluble work frame 20, Figs. 8 and 9. In this case the straight grooves 33 are cut by traveling the work vertically across the cutter by operating the reciprocating slide o or by traveling the work horizontally by operating the table c by the shaft e, and the curved grooves 34 are cut by rotating the work frame 20 on its pivot 21 by the worm 23, the curvature or radii of the grooves 34 being obtained by adjusting the work frame 20 so that its pivot 21 is to the required extent either vertically or longitudinally out of line with the center of the cutter.

By providing the spindle 19 with a suitable cutter or tool, the machine may be employed for cutting moldings, mortising, tenoning, trenching, slotting, boring, grooving, dovetailing and similar work.

What I claim and desire to secure by Letters Patent is:—

1. A wood-working machine comprising a bed-frame, a table adapted to be traveled thereon in two directions at right angles to each other and means for traveling the table, a guide member pivoted to said table and adapted to be adjusted to various angles, and means for clamping the guide member to the table, a slide adapted to be traveled on said guide member and means for traveling said slide.

2. A wood-working machine comprising a bed-frame, a table adapted to be traveled thereon in two directions at right angles to each other and means for traveling the table, a guide member pivoted to said table and adapted to be adjusted to various angles and means for clamping the guide member to the table, a slide adapted to be traveled on said guide member and means for traveling said slide, a work frame adjustably connected to said slide and adapted to be clamped thereto and being always in a position to be traveled along an axis which is constant in relation to the bed-frame of the machine.

3. A wood-working machine comprising a bed-frame, a table adapted to be traveled longitudinally and transversely thereon and means for traveling the table, a guide member pivoted to said table and adapted to be swung and adjusted to various angles in a plane at right angles to the table and means for clamping said guide member to the table, a slide adapted to be traveled on said guide member and means for traveling said slide, and a work frame adjustably connected to said slide and adapted to be clamped thereto and being always in a position to be traveled along an axis which is constant in relation to the bed-frame.

4. A wood-working machine comprising a bed-frame, a table adapted to be traveled thereon in two directions at right angles to each other and means for traveling the table, a guide member pivoted to said table and adapted to be adjusted to various angles and means for clamping the guide member to the table, a slide adapted to be traveled on said guide member and means for traveling said slide, and means for altering the inclination of said guide member and slide when the table and slide are at any points in their travels.

5. A wood-working machine comprising a bed-frame, a table adapted to be traveled thereon in two directions at right angles to each other and means for traveling the table, a guide member pivoted to said table and adapted to be adjusted to various angles and means for clamping the guide member to the table, a slide adapted to be traveled on said guide member and means for traveling said slide, a revoluble work frame adapted to be clamped to said slide and to be rotated thereon or to be traveled therewith.

6. A wood-working machine comprising a bed-frame, a table adapted to be traveled longitudinally and transversely thereon and means for traveling the table, a guide member pivoted to said table and adapted to be swung and adjusted to various angles in a plane at right angles to the table and means for clamping said guide member to the table, a slide adapted to be traveled on said guide member and means for traveling said slide, and a revoluble work frame adapted to be clamped to said slide and to be rotated thereon or to be traveled therewith.

In witness whereof, I have hereunto signed my name in the presence of two subscribing witnesses.

ROBERT STAMP ALLAN.

Witnesses:
 EDMUND WARD PATTISON,
 HERBERT HOWARD.